United States Patent
Elferich (10) Patent No.: US 11,973,419 B2
(45) Date of Patent: Apr. 30, 2024

(54) INVERTER CIRCUIT AND METHOD, FOR EXAMPLE FOR USE IN POWER FACTOR CORRECTION

(71) Applicant: SIGNIFY HOLDING B.V., Eindhoven (NL)

(72) Inventor: Reinhold Elferich, Aachen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 195 days.

(21) Appl. No.: 17/770,523

(22) PCT Filed: Oct. 8, 2020

(86) PCT No.: PCT/EP2020/078310
§ 371 (c)(1),
(2) Date: Apr. 20, 2022

(87) PCT Pub. No.: WO2021/078532
PCT Pub. Date: Apr. 29, 2021

(65) Prior Publication Data
US 2022/0407412 A1    Dec. 22, 2022

(30) Foreign Application Priority Data
Oct. 22, 2019   (EP) ..................................... 19204470

(51) Int. Cl.
*H02M 1/42*    (2007.01)
*H02M 1/08*    (2006.01)
*H02M 1/088*   (2006.01)

(52) U.S. Cl.
CPC ......... *H02M 1/4241* (2013.01); *H02M 1/088* (2013.01); *H02M 1/08* (2013.01)

(58) Field of Classification Search
CPC ....... H02M 1/4241; H02M 1/08; H02M 1/088
See application file for complete search history.

(56) References Cited

U.S. PATENT DOCUMENTS

| 5,747,972 A | 5/1998 | Baretich et al. |
| 2009/0196072 A1* | 8/2009 | Ye .......................... H02M 7/493 363/17 |
| 2017/0126134 A1 | 5/2017 | Young |

(Continued)

FOREIGN PATENT DOCUMENTS

| WO | 2016154595 A1 | 9/2016 | |
| WO | WO-2017178478 A1 * | 10/2017 | ............... H02M 1/08 |

OTHER PUBLICATIONS

L. Empringham, et al., "Intelligent Commutation of Matrix Converter Bi-Directional Switch Cells Using Novel Gate Drive Techniques", Power Electronics Specialists Conference, 1998, 29th Annual IEEE, Fukuoka, Japan, May 17-22, 1998, New York, NY US, vol. 1, May 17, 1998, pp. 707-713.

(Continued)

*Primary Examiner* — Gary A Nash (57) ABSTRACT

An inverter circuit receives an AC input signal and uses at least two bidirectional switches between the input terminals and a junction node to perform the electrical inversion function. A resonant circuit is formed by a primary side inductor between the junction node and a second node and a capacitor arrangement between the second node and the input terminals.

9 Claims, 6 Drawing Sheets

(56) References Cited

U.S. PATENT DOCUMENTS

2018/0337610 A1\* 11/2018 Leong .................. H02M 1/083
2019/0081572 A1 3/2019 Hatano

OTHER PUBLICATIONS

S. Widodo, et al., "A Series Resonant AC-to-DC Rectifier With High-Frequency Isolation", Proceedings of the Annual Applied Power Electronics Conference and Exposition (APEC), Orlando, Feb. 13-17, 1994, New York, NY US vol. 1, Feb. 13, 1994, pp. 397-403.
P.N. Enjeti, et al., "An Approach to Realize Higher Power PWM AC Controller", Proceedings of the Annual Applied Power Electronics Conference and Exposition (APEC), San Dieto, California, US, Mar. 7-11, 1993, Proceedings of the Annual Applied Power Electronics Conference and Exposition (APEC), New York, IEEE, US, vol. Conf. 8, Mar. 7, 1993, pp. 323-327.
AN2644 Application Note: "An Introduction to LLC Resonant Half-Bridge Converter Contents", Sep. 15, 2008, Retrieved from the Internet on Feb. 11, 2016, pp. 61, 62, 8, 9, Figure 4.

\* cited by examiner

| Phase       | POS: v(l) > 0 |       |           |     |
|-------------|---------------|-------|-----------|-----|
| Interval    | 0             | 1     | 2         | 3   |
| v(x)        | 0 => v(l)     | v(l)  | v(l) => 0 | 0   |
| v(gH1, sH)  | V0            | V1    | V0        | V0  |
| v(gH0, sH)  | V1            | V1    | V1        | V1  |
| v(gL1, sL)  | V0            | V0    | V0        | V1  |
| v(gL0, sL)  | V1            | V1    | V1        | V1  |

| Phase       | NEG: v(l) < 0 |       |           |     |
|-------------|---------------|-------|-----------|-----|
| Interval    | 4             | 5     | 6         | 7   |
| v(x)        | 0 => v(l)     | v(l)  | v(l) => 0 | 0   |
| v(gH1, sH)  | V1            | V1    | V1        | V1  |
| v(gH0, sH)  | V0            | V1    | V0        | V0  |
| v(gL1, sL)  | V1            | V1    | V1        | V1  |
| v(gL0, sL)  | V0            | V0    | V0        | V1  |

| Phase       | POS: $v(l) > 0$ |           |               |     |
|-------------|-----------------|-----------|---------------|-----|
| Interval    | 0               | 1         | 2             | 3   |
| v(x)        | $0 \Rightarrow v(l)$ | $v(l)$ | $v(l) \Rightarrow 0$ | 0   |
| v(gH1, sH)  | V0              | V1        | V0            | V0  |
| v(gH0, sH)  | V1              | V1        | V1            | V0  |
| v(gL1, sL)  | V0              | V0        | V0            | V1  |
| v(gL0, sL)  | V1              | V0        | V1            | V1  |

| Phase       | NEG: $v(l) < 0$ |           |               |     |
|-------------|-----------------|-----------|---------------|-----|
| Interval    | 4               | 5         | 6             | 7   |
| v(x)        | $0 \Rightarrow v(l)$ | $v(l)$ | $v(l) \Rightarrow 0$ | 0   |
| v(gH1, sH)  | V1              | V1        | V1            | V0  |
| v(gH0, sH)  | V0              | V1        | V0            | V0  |
| v(gL1, sL)  | V1              | V0        | V1            | V1  |
| v(gL0, sL)  | V0              | V0        | V0            | V1  |

FIG. 9

FIG. 10

INVERTER CIRCUIT AND METHOD, FOR EXAMPLE FOR USE IN POWER FACTOR CORRECTION

CROSS-REFERENCE TO PRIOR APPLICATIONS

This application is the U.S. National Phase application under 35 U.S.C. § 371 of International Application No. PCT/EP2020/078310, filed on Oct. 8, 2020, which claims the benefit of European Patent Application No. 19204470.9, filed on Oct. 22, 2019. These applications are hereby incorporated by reference herein.

FIELD OF THE INVENTION

This invention relates to inversion circuits and methods, for example to form part of a power factor correction circuit, in particular which avoids the need for a diode bridge rectifier.

BACKGROUND OF THE INVENTION

A function implemented within a power converter which is supplied with mains (or other AC) power is power factor correction (PFC). The power factor of an AC electrical power system is defined as the ratio of the real power flowing to the load to the apparent power in the circuit. A power factor of less than one means that the voltage and current waveforms are not in phase and/or do not have the same shape. A phase shift for example reduces the instantaneous product of the two waveforms and the average power delivered over a mains cycle. The real power is the capacity of the circuit for performing work in a particular time. The apparent power is the product of the current and voltage of the circuit. Due to energy stored in the load and returned to the source, or due to a non-linear load that distorts the waveform of the current drawn from the source, the apparent power will be greater than the real power.

If a power supply is operating at a low power factor, a load will draw more current for the same amount of useful power transferred than for a higher power factor.

The power factor can be increased using power factor correction. For linear loads, this may involve the use of a passive network of capacitors or inductors. Non-linear loads typically require active power factor correction to counteract the distortion and raise the power factor. The power factor correction brings the power factor of the AC power circuit closer to 1 for example by supplying reactive power of opposite sign, adding capacitors or inductors that act to cancel the inductive or capacitive effects of the load.

Active PFC makes use of power electronics to change the waveform of the current drawn by a load to improve the power factor. Active PFC circuits are most commonly based on boost switched mode converter topologies. Non-isolated flyback or isolated flyback converter topologies may also be used. Active power factor correction can be single-stage or multi-stage.

In the case of a switched mode power supply, a PFC boost converter is for example inserted between a bridge rectifier and a storage capacitor at the output of the PFC circuit. The boost converter for example may attempt to maintain a constant DC bus voltage on its output while drawing a current that has the same frequency and shape as the line voltage and is always in phase with the line voltage. Another switched-mode converter inside the power supply may produce the desired output voltage or current from the DC bus.

This forms a dual stage system, and this is the typical configuration for high power LED applications (for example more than 25 W up to about 1000 W).

Due to their very wide input voltage range, many power supplies with active PFC can automatically adjust to operate on AC power for example from about 110 V to 277V.

The diode bridge rectifier used in a typical boost converter PFC circuit takes up significant space and contributes significantly to the power consumption of the circuit.

Bridgeless boost converters and boost derived converters have already been proposed, for example since the 1980's.

More recently, and in connection with the emerging high voltage ("HV") GaN transistors (e.g., 650V), the conventional boost PFC circuits equipped with diode rectifier bridges are being replaced by so-called bridgeless versions in various industrial applications.

The losses of the bridge rectifier can then be saved to a large extent. For example at 120 Vac or for a wide mains voltage range ("IntelliVolt") the worst case losses in the mains input rectifier contribute about one third of the total losses of a PFC front end.

A bridgeless version of a boost converter can relatively easy be derived such as by connecting the mains voltage source and the boost inductor in series and in between two transistor-half-bridge junction nodes, which then share the voltage rectification and boost operation so that the voltage across the bridges still is unipolar. An electrolytic bus capacitor can be then employed.

This approach does not however apply to PFC stages with resonant half- or full-bridge converters.

It is also known that, based on the GaN HEMT (high electron mobility transistor) technology, monolithically integrated bi-directional switches can be built. For example, a common drain type of a bi-directional GaN e-mode HEMT has been disclosed.

An isolating bridgeless PFC converter has been described, that uses a semi-resonant boost converter with an active clamping capacitor and a polarity flipping circuit, in C. D. Davidson, "Single stage true bridgeless AC/DC power factor corrected converter", 2015 IEEE International Telecommunications Energy Conference (INTELEC)).

In this proposal, three bidirectional switches are employed and which are formed by discrete back-to-back connected IGBTs and MOSFETs.

A disadvantage of the typical boost converter type of bridgeless front end is the limited potential for size reduction. For example, the circuit described in the C. D. Davidson reference has relatively bulky clamping and polarity flipping circuitry, a relatively large boost inductor and transformer, and an extra bidirectional switch.

SUMMARY OF THE INVENTION

The invention is defined by the claims.

According to examples in accordance with an aspect of the invention, there is provided a bridgeless inverter circuit, comprising:
  an input for receiving a non-rectified AC input signal;
  first and second terminals for receiving power from the input;
  a first bidirectional switch between the first terminal and a junction node;
  a second bidirectional switch between the second terminal and the junction node;
  a primary side inductor between the junction node and a second node; and a capacitor arrangement between the second node and the first and/or second terminals.

This inverter circuit is "bridgeless" in the sense that no diode bridge is needed. This means the inverter may for example be used in a bridgeless power factor correction (PFC) circuit. The inverter circuit combines the size and efficiency benefits of a resonant converter front end with the advantages of a bridgeless input circuit, which are the loss reduction and the improvement of the power factor. The rectifier related disturbances are avoided so that a lower total harmonic distortion (THD) can be rendered.

The capacitor arrangement for example comprises a first capacitor between the second node and the first terminal and a second capacitor between the second node and the second terminal.

The first and second bidirectional switches preferably each comprise first and second transistors in anti-series. In this way, the switching function of the bidirectional switch may be divided between the two transistors, each of which has its own gate contact, to create a switching sequence, and this switching sequence may depend on the polarity at the input. One of the transistors functions as a master and the other functions as a slave. For example, one of the transistors functions as a switch and the other functions as a diode, with the roles depending on the polarity of the input.

Each pair of first and second transistors in series for example has a common source or common drain at a junction node between the first and second transistors. Thus, a common source or common drain connection is possible for the transistor pairs.

The circuit preferably further comprises a control circuit for controlling the switching of the transistors. The control circuit is for example adapted to implement, for each bidirectional switch:

an on mode, in which the respective first and second transistors are turned on;

a first transition mode in which the first transistor is turned on and the second transistor is turned off; and a second transition mode in which the second transistor is turned on and the first transistor is turned off.

The different transition modes are for example used during different polarities of the input. For example, the controller may be adapted to implement a control sequence in which:

when the voltage at the first terminal is greater than the voltage at the second terminal, the control sequence for each bidirectional switch makes use of the on mode and the first transition mode; and when the voltage at the first terminal is lower than the voltage at the second terminal, the control sequence for each bidirectional switch makes use of the on mode and the second transition mode.

The control circuit may be further adapted to implement for each bidirectional switch an off mode, in which the respective first and second transistors are turned off.

The controller is then adapted to implement a control sequence in which:

when the voltage at the first terminal is greater than the voltage at the second terminal, the control sequence for each bidirectional switch makes use of the on mode, the off mode and the first transition mode; and when the voltage at the first terminal is lower than the voltage at the second terminal, the control sequence for each bidirectional switch makes use of the on mode, the off mode and the second transition mode.

This provides an alternative control scheme.

Each bidirectional switch for example comprises a GaN dual transistor switch.

The invention also provides a power factor correction circuit comprising an inverter circuit as defined above and an output circuit comprising a secondary side inductor coupled to the primary side inductor. The power factor correction circuit may further comprise a second inverter circuit as defined above. The capacitor arrangement may provide DC blocking, and hence not form part of a resonant tank. The power factor correction circuit optionally may be a resonant circuit in which case the capacitor arrangement functions as part of the resonant tank.

The invention also provides a resonant converter comprising an inverter circuit as defined above, and an output circuit comprising a secondary side inductor coupled to the primary side inductor.

The invention also provides a method for providing electrical inversion, comprising:

receiving a non-rectified AC input signal at first and second terminals;

controlling switching of a first bidirectional switch between the first terminal and a junction node (x) and a second bidirectional switch between the second terminal and the junction node (x), wherein a primary side inductor is between the junction node and a second node, a capacitor arrangement is between the second node and the first and/or second terminals, wherein the method comprises, for each bidirectional switch, implementing:

an on mode, in which the respective first and second transistors are turned on;

a first transition mode in which the first transistor is turned on and the second transistor is turned off; and a second transition mode in which the second transistor is turned on and the first transistor is turned off.

The method may comprise implementing a control sequence in which:

when the voltage at the first terminal is greater than the voltage at the second terminal, the control sequence for each bidirectional switch makes use of the on mode and the first transition mode; and when the voltage at the first terminal is lower than the voltage at the second terminal, the control sequence for each bidirectional switch makes use of the on mode and the second transition mode.

The method may comprise, for each bidirectional switch, implementing an off mode, in which the respective first and second transistors are turned off. The control sequence may then be arranged in which:

when the voltage at the first terminal is greater than the voltage at the second terminal, the control sequence for each bidirectional switch makes use of the on mode, the off mode and the first transition mode; and when the voltage at the first terminal is lower than the voltage at the second terminal, the control sequence for each bidirectional switch makes use of the on mode, the off mode and the second transition mode.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which:

FIG. 4 shows on the right the shape of one of the high frequency pulses when $v(1)<v(n)$ i.e., the right part of FIG. 3;

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an inverter circuit which receives an AC input signal and uses at least two bidirectional switches between the input terminals and a junction node to perform the electrical inversion function. A resonant circuit is formed by a primary side inductor between the junction node and a second node and a capacitor arrangement between the second node and the input terminals.

Figure 1:
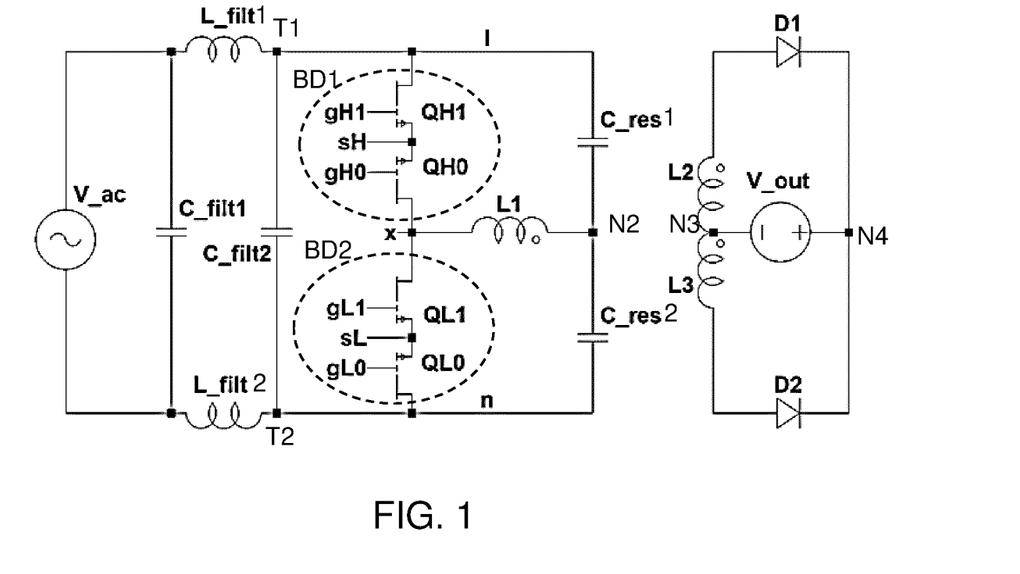
FIG. 1 shows a power factor correction circuit front end comprising an inverter and a resonant LLC converter with a common source configuration.

FIG. 1 shows a power factor correction circuit front end comprising an inverter and a resonant LLC converter.

The circuit comprises an inverter circuit at the input side and the resonant circuit at the output side.

The inverter circuit comprises an input for receiving an AC input signal V_ac after filtering by LC filter circuit C_filt1, C_filt2, L_filt1, L_filt2. The AC input is a non-rectified mains input signal. The input to the inverter circuit comprises first and second terminals T1, T2 for receiving power from the input after the filtering stage. In the example shown, T1 is denoted live (1) and T2 is denoted neutral (n).

A first bidirectional switch BD1 is between the first terminal T1 and a junction node x and a second bidirectional switch BD2 is between the second terminal T2 and the junction node x.

A primary side inductor L1 is provided between the junction node x and a second node N2. A first capacitor C_res1 is between the second node N2 and the first terminal T1 and a second capacitor C_res2 is between the second node N2 and the second terminal T2. The capacitors may be used to form a resonant tank in a resonant converter or resonant power factor correction circuit.

The filtering stage has LC filter elements and no mains rectifier.

The power factor correction circuit has an output stage represented as a dc voltage sink V_out. The output voltage is defined between output nodes N3 and N4. There are two parallel branches between N3 and N4, each of an inductor (magnetically coupled to the inductor L1) and diode. One of the branches is L2 and D1 and the other is L3 and D2.

There may be an additional mains storage capacitor (not shown). This may be considered as part of V_out.

The inductors L1, L2 and L3 form a transformer and the capacitors C_res1 and C_res2 in some circuit implementations form a resonant tank with the transformer inductors.

The bidirectional switches BD1, BD2 each comprise a pair of transistor switches. The first, high side, bidirectional switch BD1 comprises two anti-series transistors QH1 and QH0. The second, low side, bidirectional switch BD2 comprises two anti-series transistors QL1 and QL0. Both the high side pair QH0, QH1 and the low side pair QL0, QL1 may be considered as formed by two individual switches (the bottom and the top) as shown. Each switch pair may be built by a monolithically integrated device or by two individual chips integrated into a multi-chip module or just discrete packaged. In either case there will be two gate contacts for each bidirectional switch.

FIG. 1 shows a common source version, in which the junction between each transistor pair is the source terminal.

Figure 2:
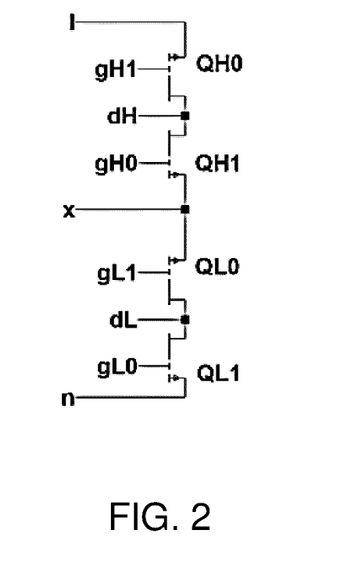
FIG. 2 shows an alternative common drain configuration.

FIG. 2 shows an alternative common drain version, in which the junction between each transistor pair of the drain terminal. This drain terminal can be left floating.

The advantage of the common source configuration of FIG. 1 is that less design effort is needed for the gate drivers since both the top and bottom gates of a pair have the same reference voltage, namely the common source voltage.

The gate drive circuitry is not displayed. It is supplied by an auxiliary supply that for example does use a bridge rectifier.

The two gates of each bidirectional switch each receive a respective gate signal (gH1, gH0, gL1 gL0). One is a master signal and the other is an auxiliary (or slave) signal.

During a positive inverter polarity (i.e., $v(1)>v(n)$, e.g., throughout the first half of a mains cycle) the master signals drive the top gates (gH1, gL1). During a negative inverter polarity, the master signals drive the bottom gates (gH0, gL0).

The slave gates can either be kept turned on all the time or can be switched, as explained in more detail below. The advantage of the switching of all four gate signals is that, in the case of inductive gate driving/gate drive transformers, Manchester coding can be supported.

Figure 3:
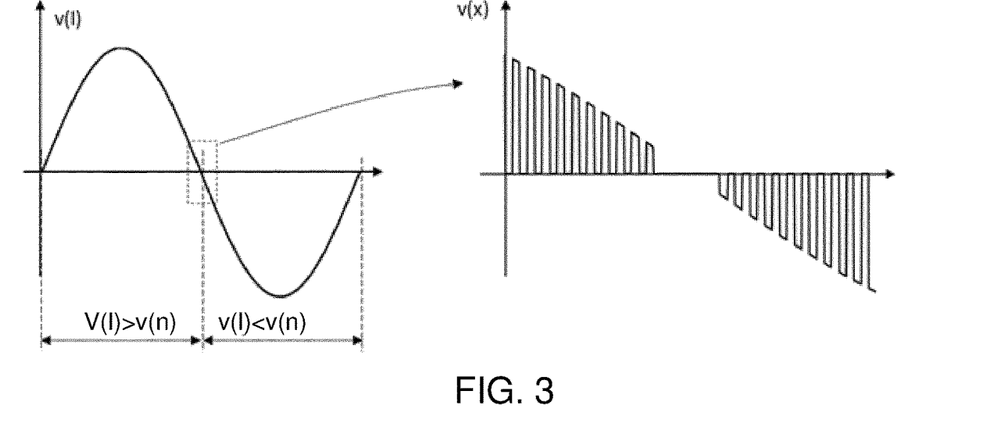
FIG. 3 shows the input ac voltage on the left and the shape of the voltage at the node x on the right, for a portion of the input voltage where the polarity changes (from $v(1)>v(n)$ to $v(1)<v(n)$) and for the circuit of FIG. 1.

FIG. 3 shows the input ac voltage on the left and the shape of the voltage $v(x)$ at the node x on the right, for a portion of the input voltage where the polarity changes (from $v(1)>v(n)$ to $v(1)<v(n)$).

The inverter generates a high frequency switched version of the input voltage, based on the control signals applied to the transistors.

Figure 4:
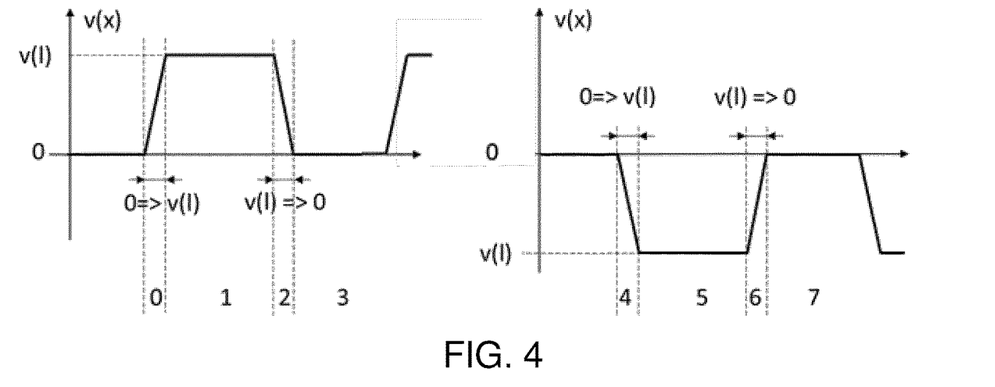
FIG. 4 shows on the left the shape of one of the high frequency pulses when $v(1)>v(n)$ i.e., the left part of FIG. 3.

FIG. 4 shows on the left the shape of one of the high frequency pulses when $v(1)>v(n)$ i.e., the left part of FIG. 3, and FIG. 4 shows on the right the shape of one of the high frequency pulses when $v(1)<v(n)$ i.e., the right part of FIG. 3.

Note that v(n) is defined as zero in these graphs. At the flat parts of the graphs of FIG. 4, i.e., ignoring the transients, v(x)=v(1) or else v(x)=v(n)=0.

Figure 5:
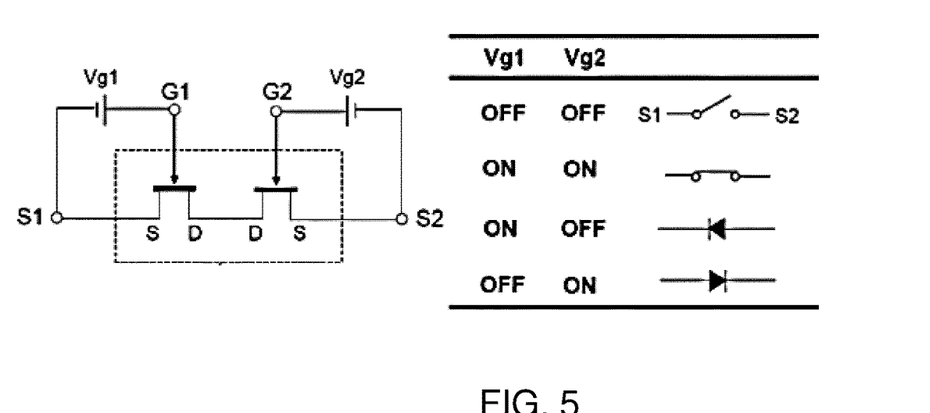
FIG. 5 shows an example of the circuit diagram for the bidirectional switch and a table of the operating modes.

FIG. 5 shows an example of the circuit diagram for the bidirectional switch and a table of the operating modes. When both switches are turned on or off together, bidirectional modes are defined. When one switch is turned on at a time, a diode mode is defined as shown. FIG. 5 shows a common drain connection.

Each transistor acts as a switch for a positive drain-source voltage and as a diode for a negative one. The transistors are for example GaN transistors, such as GaN e-mode HEMTs. These have larger forward bias voltage at reverse conduction of about 2V compared to 0.7V of a pn-junction diode as present in Si-MOSFETs. There is no diode in HEMTs, but reverse biasing the drain-source terminals lets them behave in this way, because the transistor can conduct in the third quadrant as well, only if the reverse bias voltage exceeds the gate threshold (at 0V gate-source voltage).

Figure 6:
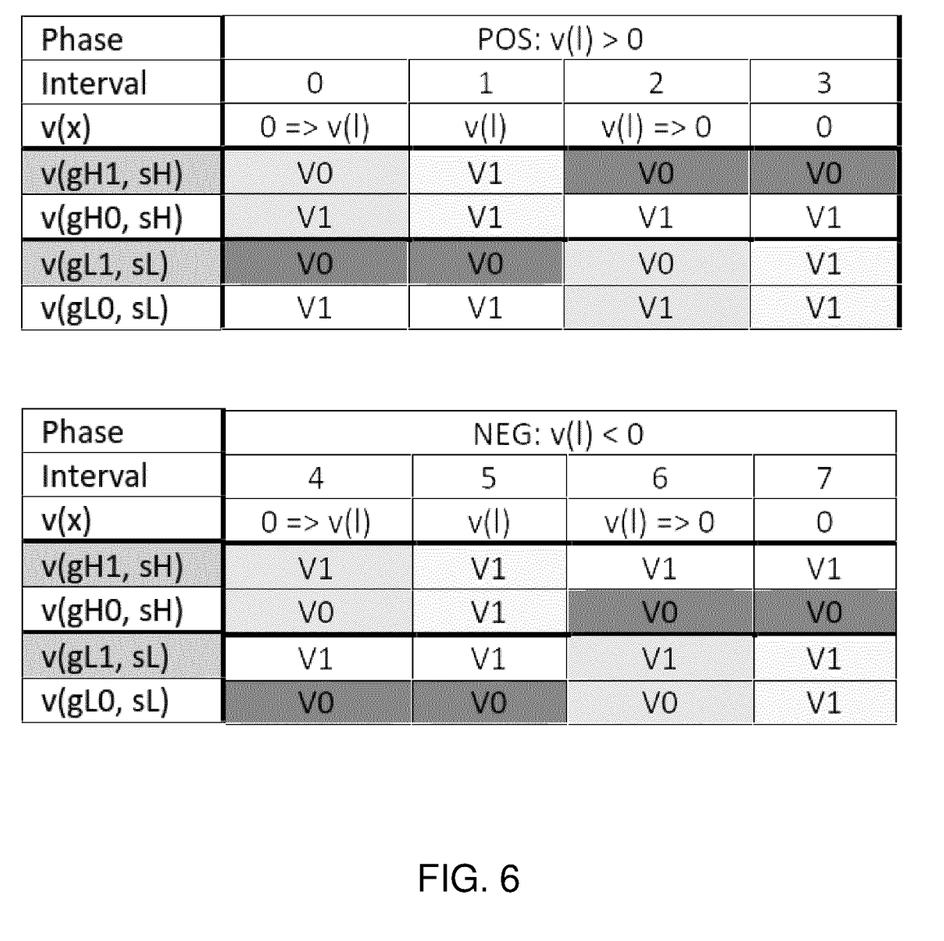
FIG. 6 shows a control sequence for the operation of the four transistors in the circuit of FIG. 1.

FIG. 6 shows a control sequence for the operation of the four transistors.

In FIG. 6, v(a,b) denotes the voltage of a relative to b. For example, v(gH1, sH) denotes the voltage applied to the gate gH1 of transistor QH1 relative to the source voltage sH.

For the transistors, a gate voltage of V1 denotes an on (conducting) state, and a voltage of V0 denotes an off state.

It is noted that the control may be based on voltage or current, depending on the type of transistor. Thus, V0 should more generally be considered to relate to an off command and V1 should more generally be considered to relate to an on command.

Each bidirectional switch has an on mode, in which the first and second transistors are turned on (V1 and V1), a first transition mode in which the first transistor is turned on and the second transistor is turned off (V1 and V0) and a second transition mode in which the second transistor is turned on and the first transistor is turned off (V0 and V1).

The top part of FIG. 6 shows the switching sequence for the positive phase of the ac input, i.e., when v(1)>v(n), hence v(1)>0.

There are four intervals, as also shown in the left part of FIG. 4.

Interval 0 is the transition at the beginning of a positive v(x) pulse, when v(x) rises from 0 to v(1).

Interval 1 is the period when v(x)=v(1).

Interval 2 is the transition at the end of a v(x) pulse, when v(x) falls from v(1) to 0.

Interval 3 is the period between v(x) pulses, when v(x)=0.

The bottom part of FIG. 6 shows the switching sequence for the negative phase of the ac input, i.e., when v(1)<v(n), hence v(1)<0.

There are again four intervals, as also shown in the right part of FIG. 4.

Interval 4 is the transition at the beginning of a negative v(x) pulse, when v(x) falls from 0 to the negative v(1).

Interval 5 is the period when v(x)=v(1).

Interval 6 is the transition at the end of a v(x) pulse, when v(x) rises from v(1) to 0.

Interval 7 is the period between v(x) pulses, when v(x)=0.

During the positive live voltage phase, in the intervals 1 and 3 the junction node x is either connected to live or to neutral by a pair with both transistors turned on. This also holds for the intervals 5 and 7 of the negative phase with a negative live voltage.

In respect of the opposite transistor pair, the transistors are individually controlled.

In the positive phase, for intervals 1 and 3, only the upper transistors of the opposite pair (hence QL1 and QH1) are in the complementary state, namely off. Thus, QL1 is off during interval 1 and QH1 is off during interval 3.

This means that they receive the full blocking voltage. The lower transistors of each pair (QL0, QH0) are kept in the on state throughout the entire positive phase.

The role of the slave transistors of each pair toggles between the phases.

Thus, in the negative phase, for intervals 5 and 7, only the lower transistors of each pair (hence QL0, QH0) are in the complementary state, namely off. This means that they receive the full blocking voltage. The upper transistors of each pair (QL1, QH1) are kept in the on state throughout the entire negative phase.

Thus, when the voltage at the first terminal is greater than (or equal to) the voltage at the junction node and the voltage at the second terminal is lower than (or equal to) the voltage at the junction node (so the positive phase), the control sequence for each bidirectional switch makes use of the on mode and the first transition mode.

When the voltage at the first terminal is lower than (or equal to) the voltage at the junction node and the voltage at the second terminal is higher than (or equal to) the voltage at the junction node (so the negative phase), the control sequence for each bidirectional switch makes use of the on mode and the second transition mode.

Figure 7:
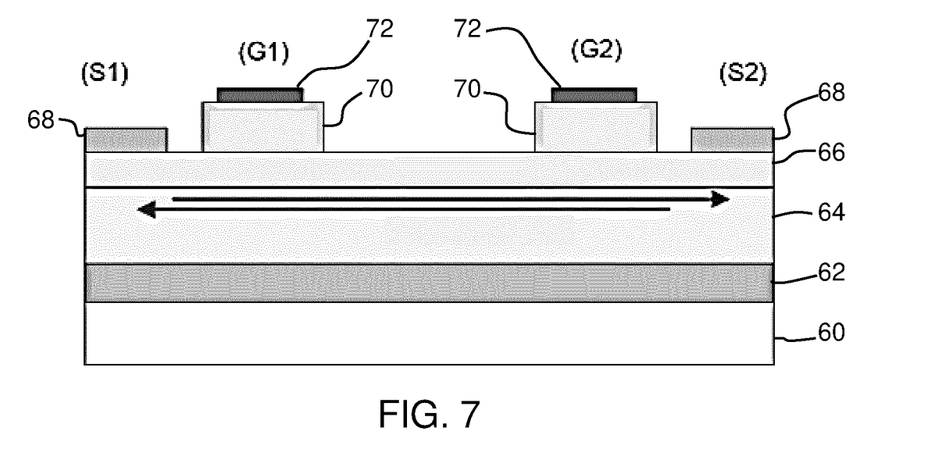
FIG. 7 shows the structure of a bidirectional GaN switch.

The use of GaN transistors for the bidirectional switches enables the switches to be monolithically integrated as depicted in FIG. 7.

The structure of FIG. 7 comprises a silicon substrate 60, buffer layer 62, i-GaN layer 64, i-AlGaN layer 66 and drain/source contact layer 68. The gates comprise a gate stack of a p-AlGaN layer 70 and a gate electrode layer 72.

There are various gate structures used for GaN e-mode HEMTs. The structure shown in FIG. 7 employs an extra gate injection transistor ('GIT', or 'p-GaN gate'), which means that a current is needed to be applied to keep the device in the on mode rather than a voltage. Voltage driving is the case for an alternative technology using a simple (Schottky) gate structure.

The two transistors are side by side with separate gates. A bidirectional GaN switch benefits from the relatively low on state resistance of GaN devices and from their relatively low output capacitance and their low gate charge.

For GaN bidirectional switches based on a voltage-controlled Schottky gate structure, example values for the two gate voltage levels are V1=5V, V0=0V.

For the control scheme of FIG. 6, when the two transistors of a pair are switched oppositely, turning off the transistor that experiences a reverse drain-source voltage does not cause the device to block any voltage higher than 0.7 or 2V because it is the diode mode. Thus, the control approach of FIG. 6 allows that transistor to be turned on for the whole phase (positive or negative) in order to keep the gate driving simple and efficient. The master device, which is controlled by the master signal, is switched to determine whether the bidirectional switch is blocking or conducting and the slave device remains on.

An alternative gate driving approach is described below in connection with a more detailed gate timing scheme.

Figure 8:
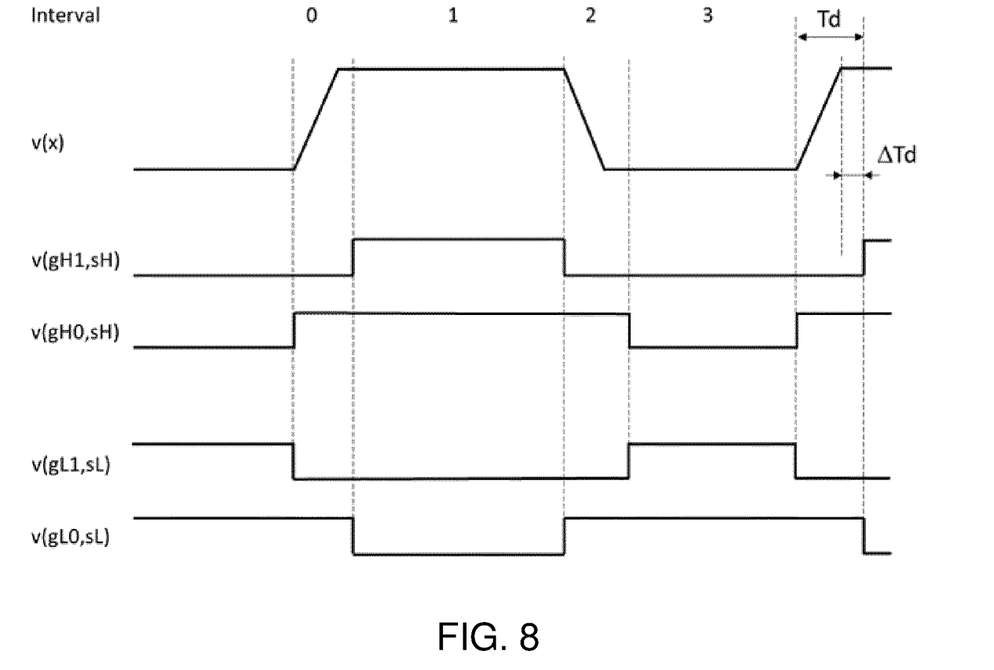
FIG. 8 shows the waveforms for the individual gate drive voltages, as well as the junction node voltage $v(x)$ for this alternative driving scheme.

FIG. 8 shows the waveforms for the individual gate drive voltages, as well as the junction node voltage v(x) for this alternative driving scheme, and in particular during the positive phase (so the v(x) pulses are positive) and for the common source configuration. It differs from the first scheme of FIG. 6 in the control of the slave transistors, which are now also turned on and off periodically.

The master transistors (which are QH1 and QL1 during the positive phase) are turned on after a dead time Td, which is longer than the transition time taken (longer by ΔTd). However, the slave devices must be turned on at latest at the end of the transition because then their diode mode ends and they must be conductive to facilitate the diode mode of the master transistors.

Such an exact timing is impractical for the slave devices, which means they need to be switched earlier. Instead, they are switched by Td earlier, namely when the respective master device of the respective pair is switched (i.e., QH0 and QL0 are actuated in complementary manner to QL1 and QH1). This approach requires generating only two timing signals per half period.

Figure 9:
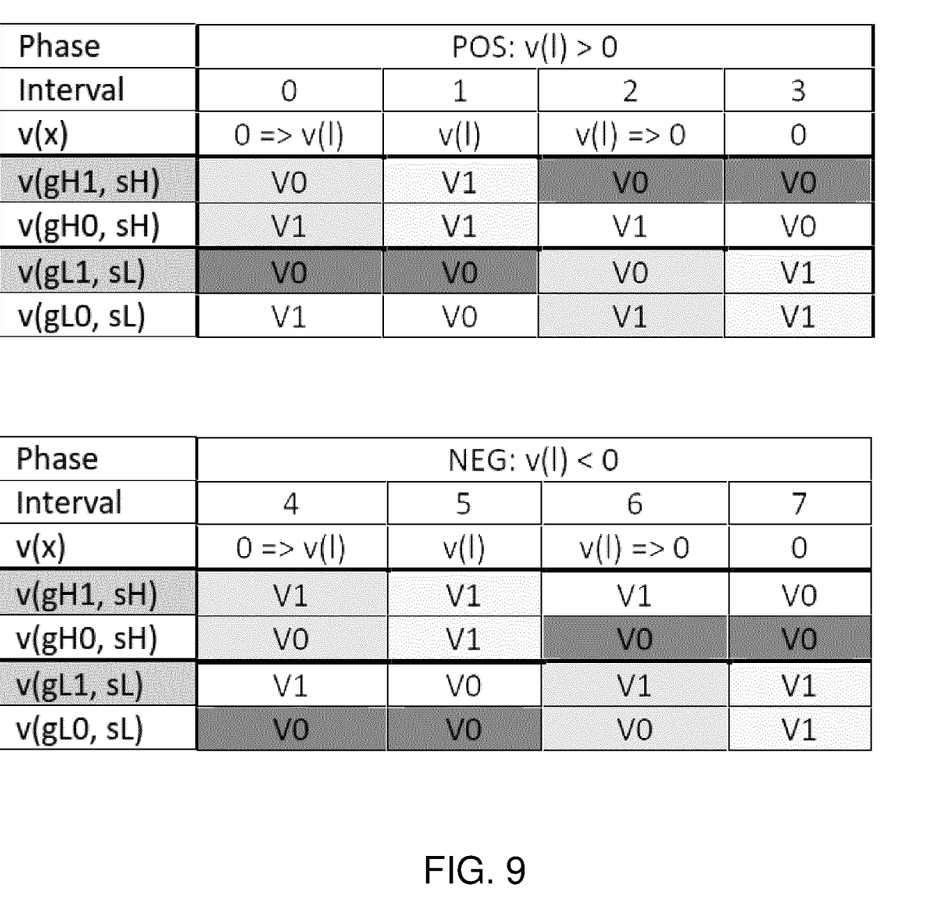
FIG. 9 shows a control sequence for the operation of the four transistors for the driving scheme of FIG. 8.

FIG. 9 shows a control sequence for the operation of the four transistors. The same intervals are identified as in FIG. 6.

Because the slave transistors are now also switched, the off mode of each bidirectional switch is also used, in which the respective first and second transistors are both turned off.

In the positive phase, the control sequence for each bidirectional switch makes use of the on mode, the off mode and the first transition mode (with the upper transistor e.g., QH1 off and the lower transistor e.g., QH0 on).

In the negative phase, the control sequence for each bidirectional switch makes use of the on mode, the off mode and the second transition mode (with the upper transistor e.g., QH1 on and the lower transistor e.g., QH0 off), This drive scheme allows for a gate drive by means of a pair of transformers, which can be beneficial at high switching frequencies. Gate drive transformers can replace level-shifting type of gate drivers, which are limited in frequency. Resonant gate drive transformers for half-bridges recover the energy from discharging the gate of the one (e.g., lower) device to charge the gate of the other (e.g., upper) device. The adjustment of the dead time is cumbersome though because charging and discharging cannot be disentangled.

Figure 10:
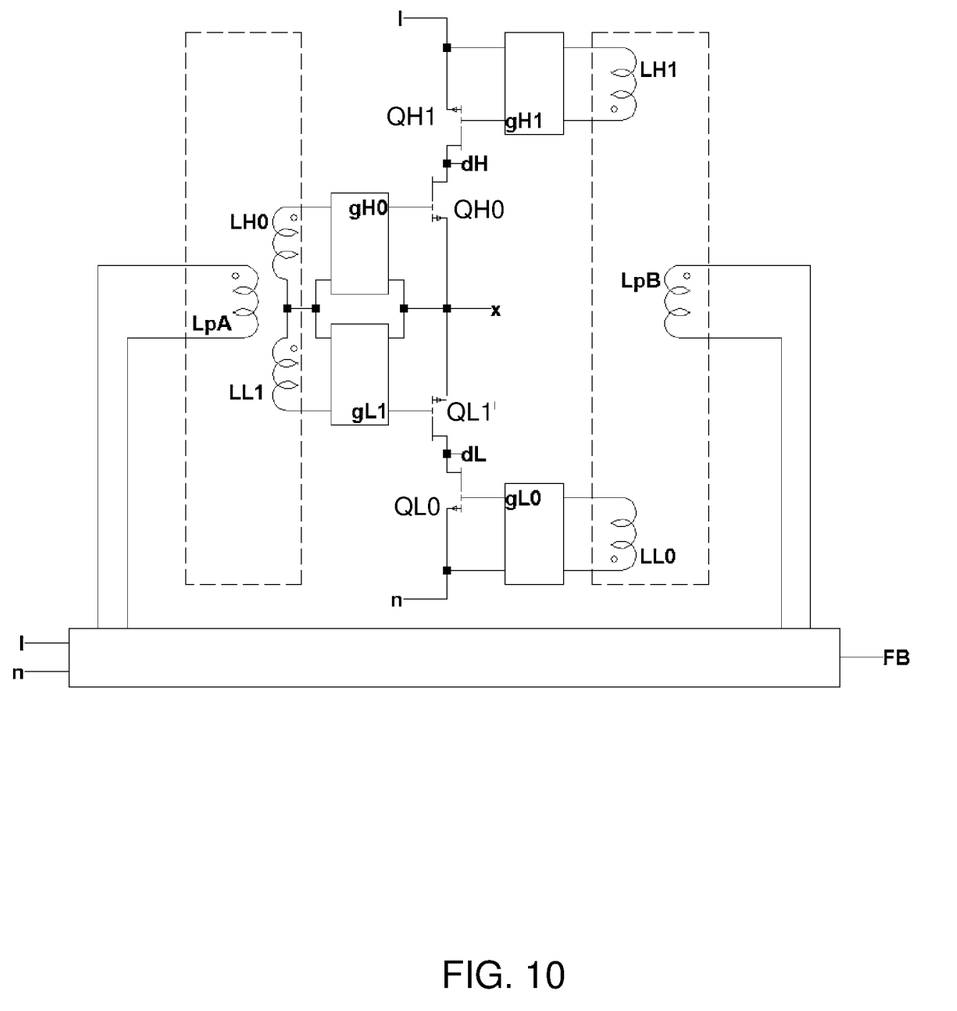
FIG. 10 shows an alternative arrangement of gate drive circuits.

FIG. 10 shows how the gate driving approach shown in FIGS. 8 and 9 allows a pair of gate drive transformers to be employed. In particular, the scheme of FIG. 9 allows two gate pairs to be provided which are switched at the same time with one of them turned on and the other off, which suits the resonant gate driver transformer approach.

Gate drivers need to handle both the signal transmission and sourcing or sinking the gate charge to turn on or off the transistor's channel. Both become difficult at frequencies in the MHz range with standard level shifters because of the large (parasitic) capacitances involved which also holds for the bootstrapping technique used to provide gate driving power. Non-galvanic signal transmissions are used for the floating (high side) transistors (e.g. optical transmission, signal transformer or RF link).

In connection with gate driving, transformers have not only been used for transmitting the signal, but also as part of a floating gate driver power supply. Transformers may be used for both of these functions at the same time.

For the floating gate driver power supply, resonant gate drivers have been described with two complementary outputs meant for driving the low and high side transistor of a half-bridge. Resonant gate drive transformers for half-bridges recover the energy from discharging the gate of the one (e.g. lower) device to charge the gate of the other (e.g. upper upper) device. The adjustment of the deadtime is cumbersome though because charging and discharging cannot be disentangled.

Implementing the above timing pattern of FIG. 8 for the two switches of a bidirectional half-bridge with its three or four floating transistors (for the common drain or common source configuration) and regarding high frequency operation can mean a relatively complex gate driver configuration using one of the above listed known principles employing four e.g. individual floating gate drive circuits.

Regarding the second driving scheme for the bidirectional half-bridge of FIG. 6, two gate pairs can be built which are switched at the same time with one of them turned on and the other off at the same time.

FIG. 10 schematically shows such a gate driver for a common drain configuration. There are two gate driver pairs (A and B) with two outputs each (gH0, gL1 for the A gate driver pair and gH1, gL1 for the B gate driver pair) that are switched simultaneously and with complementary signals. The delay between the switching events of the first and second pair is the dead time (Td) of the half-bridge inverter i.e., the time when both (bidirectional) switches are off.

Each assembly consists of a transformer used for power and signal transmission. One gate driver has primary winding LpA and secondary windings LL0 and LH1. The other gate driver has primary winding LpB and secondary windings LH0 and LL1. The primary sides of the transformers are supplied by a central driving circuit that generates the gate driving pattern from set point and feedback information ("FB") and which in turn can be supplied from the mains (1, n). The floating secondary sides are connected via gate drive pulse conditioning circuits gH0, gL1, gH1 and gL0 to the gates and their respective sources.

In the common drain configuration shown, both sources of the first gate drive pair (A) have the same potential and undesired oscillations between the outputs due to parasitic capacitances are not excited. A similar situation is given for the second assembly (B) because the voltage difference between the two sources is the supply voltage which contains only little high frequency ripple due to the filtering capacitance C_filt2.

Because the gate drive pulses of the two outputs of each gate drive circuit are complementary and no specific delay between them needs to be arranged for, the gate discharge energy of one output can be used to charge the other and so that only a fraction of the required driving energy has to be supplied from the central supply circuit.

The use of an inverter topology is of particular interest for implementing Zero Voltage Switching (ZVS) converters. ZVS is a soft switching technique and means virtually lossless switching. Resonant converters may be used for this purpose, to enable high switching frequencies and thus miniaturizing certain passive power components. ZVS means that a transistor is only turned on if the voltage across its drain-source terminals is (virtually) zero because this avoids shorting a charged capacitor—namely the device's output capacitance. This is referred to as hard switching. Therefore, that capacitor must be discharged by a current that is provided by the power converter circuit.

For example, with reference to the interval 0, in which the junction node is raised from zero to the live voltage, initially the low side switch BD2 is turned off (by means of turning off QL1). A current that has been flowing into the junction node will keep flowing but now into both low and high side branches and thereby charge the output capacitance of QL1 (QL0 is still in the on state) and at the same time discharge the output capacitance of QH1.

Both the current and the output capacitance of the devices determine the duration and shape of the junction node voltage transition interval as well as whether the final voltage level (here the live voltage) is achieved at all. Once this voltage is reached, the high side master switch QH1 can be softly turned on because the voltage across its output capacitance has become zero.

The device QH1 needs not to be turned on exactly at that point in time. If it is kept off somewhat longer, assuming a current still is flowing into the junction node, this current will reverse bias QH1 and turn it into the diode mode, which gives some headroom for the control of the gate driving signals. This is needed if there is an adaptive dead time control. The dead time is the time during which both lower and upper master switches are in the off state so that a soft charging/discharging of the output capacitance of the devices can take place. This time can be fixed or adaptable and must in any case be long enough to ensure complete transitions under all operation conditions.

During a mains overvoltage event (surge) all four transistors can be switched off so that the half-bridge with its two bidirectional switches can withstand twice the maximum reverse drain-source blocking voltage.

An inverter may make use of two half-bridges with the resonant tank elements (transformer, resonant capacitor) connected in between the two junction nodes.

It is noted that for a common drain configuration, the roles of the pairs of transistors are swapped. Thus, the examples given above for a common source circuit can routinely be converted to a common drain configuration by one of ordinary skill in the art.

FIG. 1 shows a power factor correction circuit front end comprising an inverter and a resonant LLC converter. A non-resonant PFC circuit may have the same configuration, but the capacitors will not then form part of a resonant circuit. Instead, they will comprise DC blocking capacitors. Relatively large capacitances are used for DC blocking capacitors resulting in small voltage drops whereas the resonant capacitor experiences a large voltage drop because it is sized to be operated more or less close to the resonance frequency formed with one of the inductors. A resonant converter circuit (without power factor correction) may also be formed with the same circuit, in that the power factor correction function is implemented by the control of the converter rather than the power circuit.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A bridgeless inverter circuit, comprising:
an input for receiving a non-rectified AC input signal, wherein the non-rectified AC input signal comprises a positive polarity and a negative polarity;
first and second terminals for receiving power from the input;
a first bidirectional switch between the first terminal and a junction node (x), the first bidirectional switch comprising a first transistor and a second transistor coupled in anti-series;
a second bidirectional switch between the second terminal and the junction node (x), the second bidirectional switch comprising a third transistor and a fourth transistor coupled in anti-series;
a primary side inductor (L1) between the junction node and a second node;
a capacitor arrangement (C_res1, C_res2) between the second node and the first and/or second terminals,
wherein during the positive polarity:
the first transistor and the third transistor arranged to receive a master signal and the second transistor and fourth transistor are arranged to receive a slave signal; and
wherein during the negative polarity:
the first transistor and the third transistor are arranged to receive the slave signal and the second transistor and fourth transistor are arranged to receive the master signal,
wherein the master signal is arranged to determine whether the first bidirectional switch or the second bidirectional switch is blocking or conducting and wherein the slave signal is arranged to be kept turned on all the time, wherein the first transistor and the second transistors have a common drain at a junction node between the first transistor and the second transistor, and the third transistor and the fourth transistor have a common drain at a junction node between the third transistor and the fourth transistor, and wherein each bidirectional switch comprises a GaN dual transistor switch.

2. The bridgeless inverter circuit as claimed in claim 1, further comprising a control circuit for controlling the switching of the transistors.

3. A power factor correction circuit comprising the bridgeless inverter circuit as claimed in claim 1, and an output circuit comprising a secondary side inductor coupled to the primary side inductor.

4. A bridgeless resonant converter comprising the bridgeless inverter circuit as claimed in claim 1, and an output circuit comprising a secondary side inductor coupled to the primary side inductor.

5. A method for providing electrical inversion, comprising:
receiving a non-rectified AC input signal at first and second terminals, wherein the non-rectified AC input signal comprises a positive polarity and a negative polarity;
controlling switching of a first bidirectional switch between the first terminal and a junction node and a second bidirectional switch between the second terminal and the junction node, wherein a primary side inductor is between the junction node and a second node, a capacitor arrangement is between the second node and the first and/or second terminals, the first bidirectional switch comprising a first transistor and a second transistor coupled in anti-series and the second bidirectional switch comprising a third transistor and a fourth transistor coupled in anti-series,
wherein during the positive polarity:
the first transistor and the third transistor are arranged to receive a master signal and the second transistor and the fourth transistor are arranged to receive a slave signal; and wherein during the negative polarity:
the first transistor and the third transistor are arranged to receive the slave signal and the second transistor and the fourth transistor are arranged to receive the master signal,
wherein the master signal is arranged to determine whether the first bidirectional switch or the second bidirectional switch is blocking or conducting and wherein the slave signal is arranged to be kept turned on all the time wherein the first transistor and the second transistor have a common drain at a junction node between the first transistor and the second transistor, and the third transistor and the fourth transistor have a common drain at a junction node between the third transistor and the fourth transistor, and wherein each bidirectional switch comprises a GaN dual transistor switch.

6. A bridgeless inverter circuit, comprising:
an input for receiving a non-rectified AC input signal, wherein the non-rectified AC input signal comprises a positive polarity and a negative polarity;
first and second terminals for receiving power from the input;
a first bidirectional switch between the first terminal and a junction node, the first bidirectional switch comprising a first transistor and a second transistor coupled in anti-series;
a second bidirectional switch between the second terminal and the junction node, the second bidirectional switch comprising a third transistor and a fourth transistor coupled in anti-series;
a primary side inductor between the junction node and a second node;
a capacitor arrangement between the second node and the first and/or second terminals,
wherein the first transistor and the second transistor have a common drain at a junction node between the first transistor and the second transistor, and the third transistor and the fourth transistor have a common drain at a junction node between the third transistor and the fourth transistor,
wherein the control circuit is adapted to implement for the first bidirectional switch;
an on mode, in which the first transistor and the second transistor are turned on;
a first transition mode in which the first transistor is turned on and the second transistor is turned off;
a second transition mode in which the second transistor is turned on and the first transistor is turned off; and
an off mode, in which the first transistor and the second transistor are turned off,
wherein the control circuit is adapted to implement for the second bidirectional switch;
an on mode, in which the third transistor and the fourth transistor are turned on;
a first transition mode in which the third transistor is turned on and the fourth transistor is turned off;
a second transition mode in which the fourth transistor is turned on and the third transistor is turned off; and
an off mode, in which the third transistor and the fourth transistor are turned off,
wherein the controller is adapted to implement a control sequence in which;
when the voltage at the first terminal is greater than the voltage at the second terminal, the control sequence for each bidirectional switch makes use of the on mode, the off mode and the first transition mode; and when the voltage at the first terminal is lower than the voltage at the second terminal, the control sequence for each bidirectional switch makes use of the on mode, the off mode and the second transition mode.

7. The bridgeless inverter circuit as claimed in claim 6, further comprising:
a first gate driver comprising a first primary winding, a first secondary winding coupled to the third transistor and a second secondary winding coupled to the second transistor, wherein a gate drive pulse signal at the first secondary winding is complementary to a gate drive pulse signal at the second secondary winding (LH0); and
a second gate driver comprising a second primary winding a third secondary winding coupled to the first transistor and a fourth secondary winding coupled to the fourth transistor, wherein a gate drive pulse signal at the third secondary winding is complementary to a gate drive pulse signal at the fourth secondary winding.

8. A bridgeless inverter circuit, comprising:
an input for receiving a non-rectified AC input signal, wherein the non-rectified AC input signal comprises a positive polarity and a negative polarity;
first and second terminals for receiving power from the input;
a first bidirectional switch between the first terminal and a junction node, the first bidirectional switch comprising a first transistor and a second transistor coupled in anti-series;
a second bidirectional switch between the second terminal and the junction node, the second bidirectional switch comprising a third transistor and a fourth transistor coupled in anti-series;
a primary side inductor between the junction node and a second node;
a capacitor arrangement between the second node and the first and/or second terminals,
wherein the first transistor and the second transistor have a common drain at a junction node between the first transistor and the second transistor, and the third transistor and the fourth transistor have a common drain at a junction node between the third transistor and the fourth transistor,
wherein the control circuit is adapted to implement for the first bidirectional switch:
an on mode, in which the first transistor and the second transistor are turned on;
a first transition mode in which the first transistor is turned on and the second transistor is turned off;
a second transition mode in which the second transistor is turned on and the first transistor is turned off; and
an off mode, in which the first transistor and the second transistor are turned off,
wherein the control circuit is adapted to implement for the second bidirectional switch:
an on mode, in which the third transistor and fourth transistor are turned on;
a first transition mode in which the third transistor is turned on and the fourth transistor is turned off;
a second transition mode in which the fourth transistor is turned on and the third transistor is turned off; and
an off mode, in which the third transistor and the fourth transistor are turned off,
wherein the controller is adapted to implement a control sequence in which:
when the voltage at the first terminal is greater than the voltage at the second terminal, the control sequence for each bidirectional switch makes use of the on mode, the off mode and the first transition mode; and when the voltage at the first terminal is lower than the voltage at the second terminal, the control sequence for each bidirectional switch makes use of the on mode, the off mode and the second transition mode.

9. A method for providing electrical inversion, comprising:

receiving a non-rectified AC input signal at first and second terminals, wherein the non-rectified AC input signal comprises a positive polarity and a negative polarity;

controlling switching of a first bidirectional switch between the first terminal and a junction node and a second bidirectional switch between the second terminal and the junction node, wherein a primary side inductor is between the junction node and a second node, a capacitor arrangement is between the second node and the first and/or second terminals, the first bidirectional switch comprising a first transistor and a second transistor coupled in anti-series and the second bidirectional switch comprising a third transistor and a fourth transistor coupled in anti-series, wherein the first transistor and the second transistor have a common drain at a junction node between the first transistor and the second transistor, and the third transistor and the fourth transistor have a common drain at a junction node between the third transistor and the fourth transistor, implementing for the first bidirectional switch:

an on mode, in which the first transistor and the second transistor are turned on;

a first transition mode in which the first transistor is turned on and the second transistor is turned off;

a second transition mode in which the second transistor is turned on and the first transistor is turned off; and an off mode, in which the first transistor and the second transistor are turned off;

implementing for the second bidirectional switch:

an on mode, in which the third transistor and fourth transistor are turned on;

a first transition mode in which the third transistor is turned on and the fourth transistor is turned off;

a second transition mode in which the fourth transistor is turned on and the third transistor is turned off; and an off mode, in which the third transistor and the fourth transistor are turned off implementing a control sequence in which:

when the voltage at the first terminal is greater than the voltage at the second terminal, the control sequence for each bidirectional switch makes use of the on mode, the off mode and the first transition mode; and when the voltage at the first terminal is lower than the voltage at the second terminal, the control sequence for each bidirectional switch makes use of the on mode, the off mode and the second transition mode.

* * * * *